United States Patent
Hansen

(10) Patent No.: US 6,602,020 B1
(45) Date of Patent: Aug. 5, 2003

(54) CLAMPING TOOL

(75) Inventor: Steen Anker Hansen, Slagelse (DK)

(73) Assignee: Kongskilde Industries A/S, Sorø (DK)

( * ) Notice: Subject to any disclaimer, the term of this patent is extended or adjusted under 35 U.S.C. 154(b) by 0 days.

(21) Appl. No.: 09/601,724

(22) PCT Filed: Feb. 3, 1999

(86) PCT No.: PCT/DK99/00054

§ 371 (c)(1),
(2), (4) Date: Sep. 6, 2000

(87) PCT Pub. No.: WO99/39560

PCT Pub. Date: Aug. 12, 1999

(30) Foreign Application Priority Data

Feb. 5, 1998 (DK) .............................................. 0160/98

(51) Int. Cl.[7] ................................................ A01B 23/02
(52) U.S. Cl. ........................ 403/395; 172/707; 403/400
(58) Field of Search ................................ 403/395, 396, 403/234, 384, 400; 172/707, 709, 773

(56) References Cited

U.S. PATENT DOCUMENTS

| | | | |
|---|---|---|---|
| 1,784,613 A | * 12/1930 | Reynolds | 172/707 |
| 2,208,358 A | * 7/1940 | Chandler | 403/395 |
| 2,743,657 A | * 5/1956 | Driegbaum | 403/395 |
| 3,380,786 A | 4/1968 | Petersen | |
| 3,535,751 A | * 10/1970 | Batchelor | 403/395 |
| 3,827,505 A | * 8/1974 | Sosalla | |
| 4,050,524 A | * 9/1977 | Hake | |
| 4,465,396 A | 8/1984 | Meinert et al. | |
| 4,967,045 A | * 10/1990 | Keefer | 200/296 |

FOREIGN PATENT DOCUMENTS

| | | |
|---|---|---|
| DE | 101615 | 8/1965 |
| DK | 148401 | 7/1985 |
| FR | 451611 A1 * | 4/1913 |
| FR | 2 310 687 | 12/1976 |
| GB | 2 050 131 | 1/1981 |

* cited by examiner

Primary Examiner—Lynne H. Browne
Assistant Examiner—Ernesto Garcia
(74) Attorney, Agent, or Firm—Browdy and Neimark, P.L.L.C.

(57) ABSTRACT

The clamp (1) is intended for securing a workpiece to an agricultural implement, in particular for securing a cultivator tine to a frame member, and comprises a piece of steel sheet which by bending (4) is divided into two legs (2, 3), one leg (2) of which has an aperture (5) with an edge (8), which is substantially positioned in a plane, for receiving a part of a workpiece to be secured, the sheet material comprising along the edge (8) a part (9) extending towards the bending (4) and a remaining part (10) extending around the aperture (5) and extending from, and preferably substantially perpendicular to, the plane of the aperture edge (8) in a direction away from the second leg (3).

13 Claims, 3 Drawing Sheets

CLAMPING TOOL

CROSS REFERENCE TO RELATED APPLICATION

The present application is the national stage under 35 U.S.C. 371 of PCT/DK99/00054, filed Feb. 3, 1999.

BACKGROUND OF THE INVENTION

1. Technical Field of the Invention

The present invention relates to a clamp for securing a workpiece to an agricultural implement, in particular for securing a cultivator tine to a frame member, comprising a piece of steel sheet which by a bending is divided into two legs, one leg of which has an aperture through the steel sheet with an edge, which is substantially positioned in a plane, for receiving a part of a workpiece to be secured, in particular an end of a cultivator tine or a tine spring, the sheet material comprising along the edge a part extending towards the bending and a remaining part extending around the aperture.

2. Prior Art

Such a clamp is known for instance from GB-A-2 050 131, which discloses a clamp made from a rectangular piece of steel sheet which is provided with two apertures, one for receiving the end of a cultivator tine and one for receiving a bolt with a tapered head for clamping the second leg of the clamp and the end of the cultivator tine around a frame member, to which the cultivator tine is to be secured. The effect of using a bolt with a tapered head is that the first leg of the clamp is tightened against the frame member.

DK 101 615 C discloses a clamp for securing a cultivator tine to a frame member and being made from a piece of steel bar which is bent into a kink and two branches the latter being held together by a clamping block when the clamp is used. When in use the kink entends around the cultivator tine and the branches extends over the frame member.

OBJECT AND SUMMARY OF THE INVENTION

The object of the invention is to provide an improved clamp.

The object is met by a clamp of the type mentioned by way of introduction which is characterized in that the remaining part of the material around the aperture extends out of, and preferably substantially perpendicular to, the plane of the aperture edge in a direction away from the second leg.

The result is that the width of the clamp can be reduced to the width of the workpiece to be secured, and twice the thickness of the sheet material, which is an advantage as it provides a higher degree of freedom for the lateral positioning of for instance a cultivator tine on a frame member. Moreover, a saving of material is obtained, as the width of the second leg of the clamp may be smaller than usual. Finally, a bigger abutment surface against the workpiece to be fastened is obtained, as the sheet material of the clamp around the aperture has been turned 90° in comparison with known clamps and bears flatly against the workpiece to be fastened.

The second leg preferably has an aperture for receiving a clamping bolt, and a part of the sheet material adjacent to this aperture has been pressed down to the same side as the first leg, the result being an inclining transition from the part, which has been pressed down, to the remaining part of the second leg. By clamping, the inclining transition between the part, which has been pressed down, and the remaining part of the second leg of the clamp will have the same effect as the bolt with the tapered head used according to the above-mentioned GB-A-2 050 131, which makes it possible, with the clamp according to the invention, to use an ordinary standard bolt instead of the tapered, special bolt, which results in economy saving when replacing the bolt in case of ruptures.

The aperture in the first leg preferably forms a substantially isosceles triangle with round corners and its vertex facing the second leg. In this way an advantageous distribution of the tensions in the material is obtained.

The clamp preferably has a degree of hardness in the range of 43–49 HRC.

The object of the invention is further met by a method for the manufacture of a clamp according to the invention, which is characterized in that a plane steel sheet blank with a first and a second end is provided, the first end being provided with a throughgoing aperture with an edge, a part of the material of the blank along the edge extending towards the other end of the blank, the remaining part extending around the aperture, and that the remaining part by temperature deformation is bent out of the plane of the blank, preferably to a position substantially perpendicular to the plane of the blank and that the blank is angularly bent.

Preferred embodiments of the method appear from the dependent claims 6–9.

The invention also relates to an agricultural implement, in particular a cultivator with a member clamped on a frame member, the member being clamped by means of a clamp.

BRIEF DESCRIPTION OF THE DRAWINGS

The invention will be explained in detailed in the following by means of an example of an embodiment with reference to the drawing, in which.

DETAILED DESCRIPTION OF THE PREFERRED EMBODIMENT OF THE INVENTION

Figure 1:
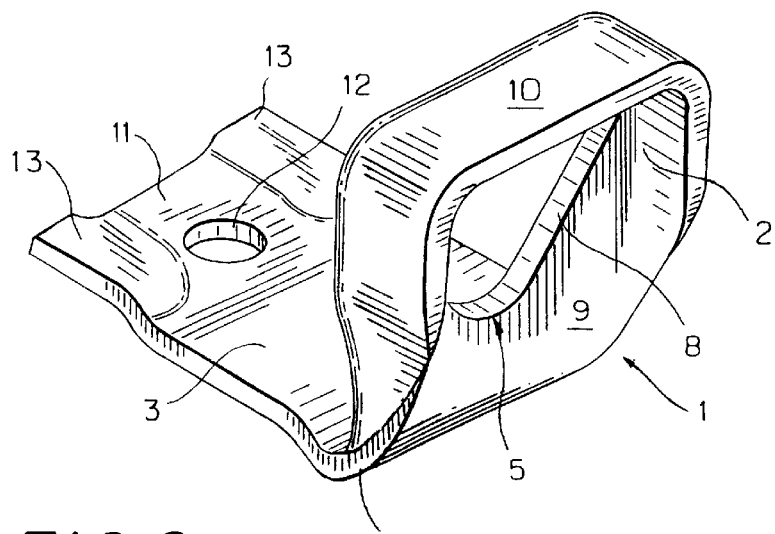
FIG. 1 is an isometric view of a clamp.

FIGS. 1 and 4–8 show a clamp 1 with a first leg 2 and a second leg 3, the first and the second legs 2, 3 meeting in a bending 4.

The first leg is provided with an aperture 5 for receiving the end of a member, for instance a cultivator tine spring 6, which is to be clamped on a frame member, like for instance a square tube, of an agricultural implement.

The aperture 5 is defined by an edge 8, positioned in the plane p of the first leg 2. A part 9 of the material of the clamp bordering the edge 8, extends towards the bending 4, whereas a remaining part or sidewall 10 of the material bordering the edge 8 is bent approx. 90° to a position perpendicular to the plane of the edge 8, as will appear from the figures.

Figure 8:
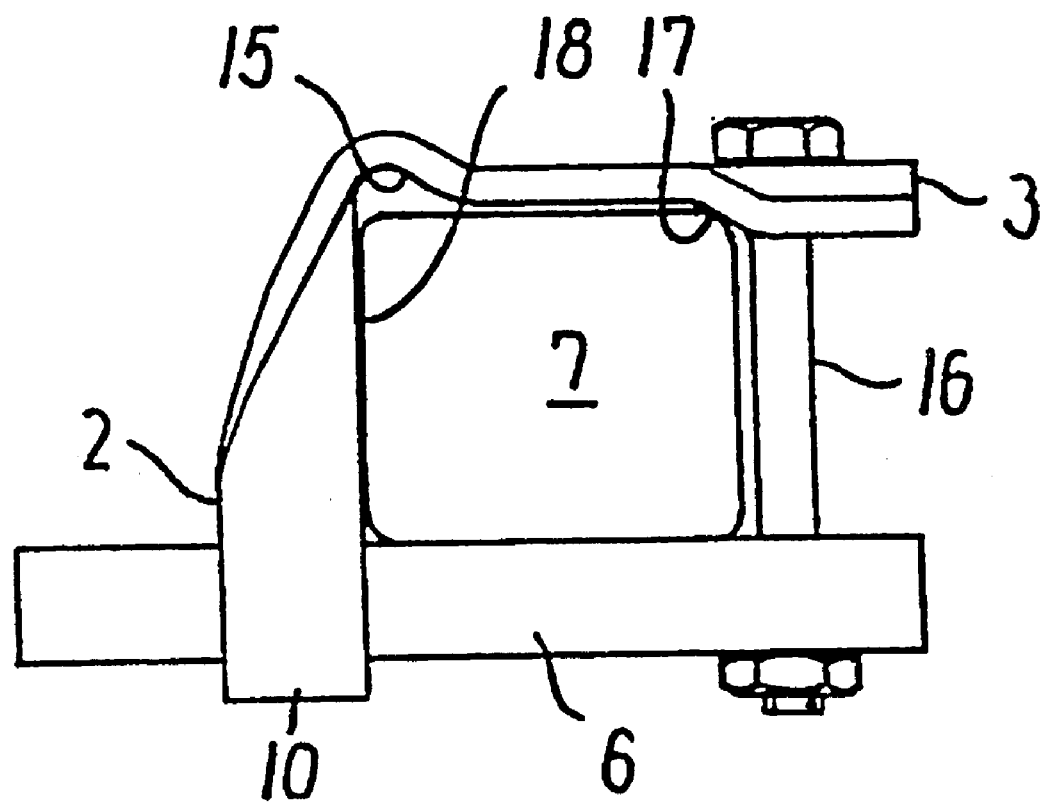
FIG. 8 illustrates the use of the clamp.

The end 11 of the second leg 3 opposite the bending 4 is provided with an aperture 12 for receiving a bolt as shown in FIG. 8. The area 13 next to the aperture 12 has been pressed down to the side, in which the first leg 2 extends, whereby inclining areas 14 have been provided between the areas 13, which have been pressed down, and the remainder of the second leg 3.

At the bending 4, a bulging 15 has been created, said bulging being known per se.

The clamp is used in a manner known per se as shown in FIG. 8, a cultivator tine spring 6 being fastened to a square tube 7 by means of the clamp 1 and a bolt 16. The cultivator tine spring 6 is passed through aperture 5 in the first leg, and the bolt 16 extends through a hole in the cultivator tine spring 6 and through the aperture 12 in the clamp to clamp these two members around the square tube 7. The inclining areas 14 abut a corner 17 of the square tube 7 and thereby pull the first leg 2 into abutment against the side 18 of the square tube.

On account of the part 10 being bent, a relatively big abutment surface is obtained between the clamp 1 and the cultivator tine spring 6 relative to what is obtained by the known clamps, a smaller surface pressure resulting.

Figure 4:
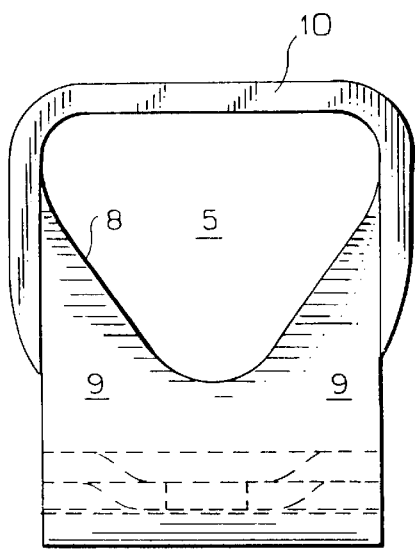
FIGS. 4–6 show the finished clamp, seen in three mutually perpendicular directions.
Figure 5:
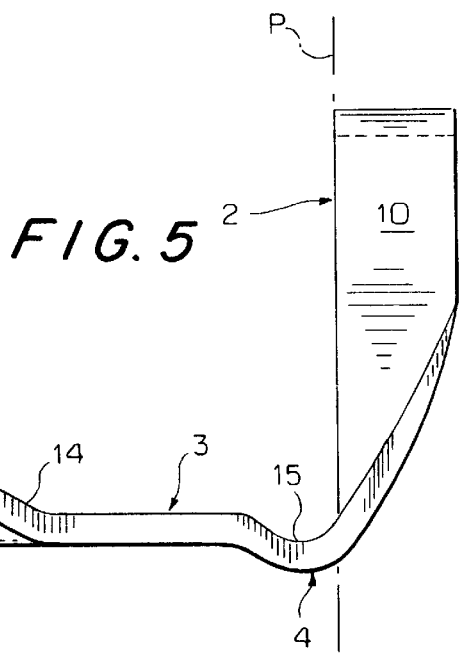
Figure 6:
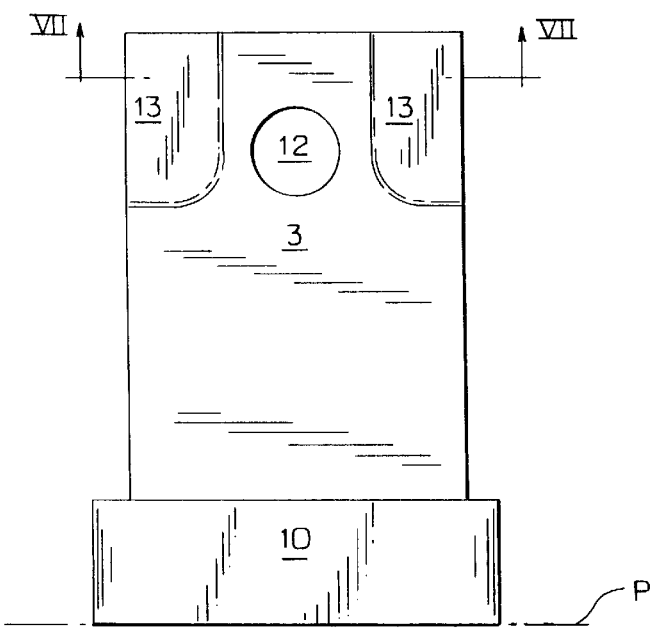
Figure 7:
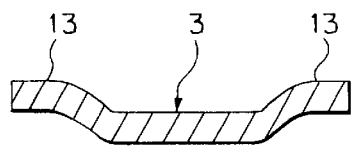
FIG. 7 is a sectional view along the line VII—VII in FIG. 6.

As will in particular appear from FIG. 4, the clamp 1 is only twice the material thickness of the part 10 wider than the aperture 5, which in turn is dimensioned according to the cultivator tine spring 6 or another member, with which the clamp is to be used. The clamp 1 according to the invention is thus narrower than similar known clamps. It is advantageous as it leaves more space for obtaining the exact positioning of the cultivator tine spring 6 along the square tube 7, which may carry many other members than cultivator tine springs.

The bulging 15 acts in a manner known per se to take up manufacturing tolerances between the square tube 7 and the clamp 1, and to prevent the second leg 3 from being brought first into abutment against the square tube 7 close to the bending 4, which would give a too big clamping force in the first leg 2 of the clamp.

Figures 2, 3:
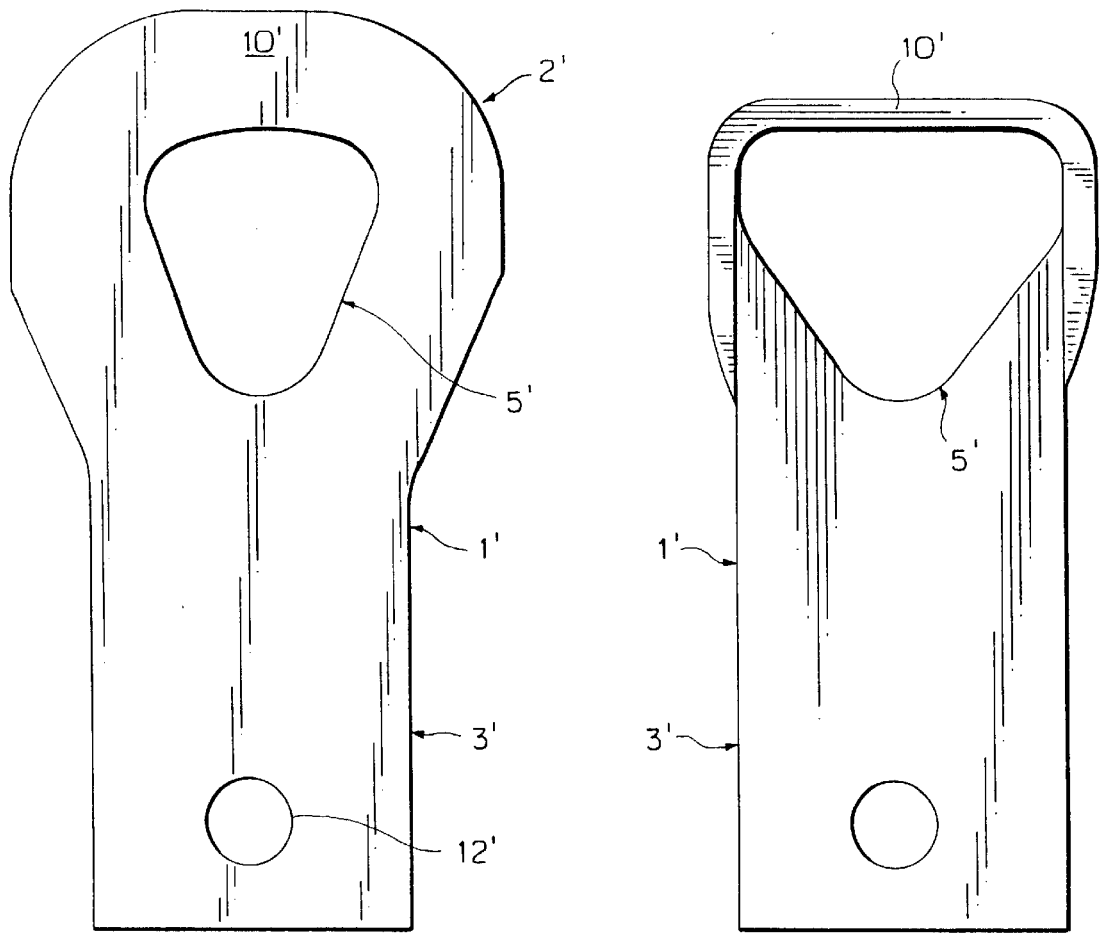
FIG. 2 shows a blank for the manufacture of the clamping means prior to shaping.
FIG. 3 shows the blank according to FIG. 2 after the deformation of the material around the aperture in the first leg.

The clamp 1 is manufactured by cutting out a clamp blank 1' from a steel sheet having an aperture 5' at one end 2', and an aperture 12' at the other end 3'. The aperture 5' is narrower than the aperture 5 in the finished workpiece. Through temperature deformation a part 10' of the blank 1' is bent, said part extending around the aperture 5', approx. 90°, such that the blank 1' is given the shape shown in FIG. 3, in which the part 10' extends upwards from the plane of the drawing. The deformation is substantially a stretching deformation. Then the areas around the aperture 12' are pressed down, and the blank 1' bent into the design shown in FIGS. 1 and 4–8. Finally, the blank is tempered to a hardness of 43–49 HRC.

What is claimed is:

1. A clamp for securing a workpiece to an agricultural implement comprising a piece of steel sheet which by a bending is divided into a first leg and a second leg, the first leg comprising a part, a remaining part, and an aperture through the piece of steel sheet, the aperture having an edge, said edge being substantially positioned in a plane, the first leg having, along said edge, the part extending towards the bending and the remaining part extending around the aperture, wherein the remaining part is formed as a sidewall extending on opposite sides of the part; and on a side of the aperture opposite the bending, the sidewall extending towards the bending, and out of the plane of the edge in a direction away from the second leg.

2. A clamp according to claim 1, wherein the second leg has an aperture for receiving a clamping bolt, the piece of steel sheet comprising a depression on either side adjacent to the aperture of the second leg extending towards the first leg, and an inclining transition from the depression to a remainder part of the second leg (3).

3. A clamp according to claim 1, wherein the aperture in the first leg forms a substantially isosceles triangle with round corners and a vertex facing the second leg.

4. A clamp according to claim 1, wherein the clamp has a degree of hardness of 43–49 Hardness Rockwell C-scaled.

5. A clamp according to claim 1, wherein the remaining part (10) of the material around the aperture (5) extends substantially perpendicular to the plane of the aperture edge (8).

6. A method for the manufacture of a clamp according to claim 1, the method comprising:

that a plane steel sheet blank (1') with a first and a second end (2', 3') is provided, the first end (2') being provided with a throughgoing aperture (5') with an edge, a part of the material of the blank along the edge extending towards the second end (3') of the blank (1'), and the remaining part (10') extending around the aperture (5'), that the remaining part (10') by temperature deformation is bent out of the plane of the blank (1') and that the blank (1') is angularly bent.

7. A method according to claim 6, wherein the blank (1') is manufactured with a width which is bigger at the first end (2') than at the second end (3').

8. A method according to claim 6, wherein the blank (1') is provided with a comparatively narrow aperture (5') as compared to the aperture of the finished clamp, which is extended with respect to the width during the heat deformation which is substantially a stretching.

9. A method according to claim 6, wherein the second end (3') is provided with impressions (13) at the sides.

10. A method according to claim 6, wherein the blank after the moulding is hardened to a degree of hardness in the range of 43–49 HRC.

11. An agricultural implement, provided with a member (6) secured on a frame part (7), in which the member (6) is secured by means of a clamp (1) according to claim 1.

12. A method according to claim 6, wherein said remaining part (10') is bent to a position substantially perpendicular to the plane of the blank.

13. A method for the manufacture of a clamp according to claim 1, the method comprising:

that a plane steel sheet blank (1') with a first and a second end (2', 3') is provided, the first end (2') being provided with a throughgoing aperture (5') with an edge, a part of the material of the blank along the edge extending towards the second end (3') of the blank (1'), and the remaining part (10') extending around the aperture (5'), that the remaining part (10') by temperature deformation is bent out of the plane of the blank (1') and that the blank (1') is angularly bent;

wherein the blank (1') is provided with a comparatively narrow aperture (5') as compared to the aperture of the finished clamp, which is extended with respect to the width during the heat deformation which is substantially a stretching.

* * * * *